C. HARTMANN.
DYNAMO MOUNTING.
APPLICATION FILED DEC. 26, 1916.

1,344,945.

Patented June 29, 1920.
2 SHEETS—SHEET 1.

INVENTOR
Carl Hartmann
BY
John L. Crowling
ATTORNEY

C. HARTMANN.
DYNAMO MOUNTING.
APPLICATION FILED DEC. 26, 1916.
1,344,945.
Patented June 29, 1920.
2 SHEETS—SHEET 2.
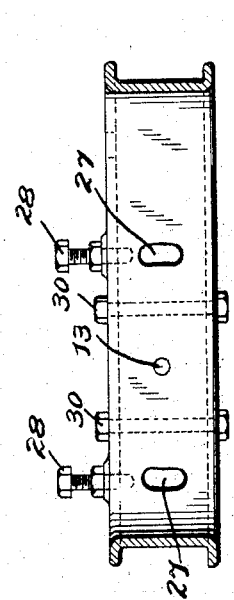
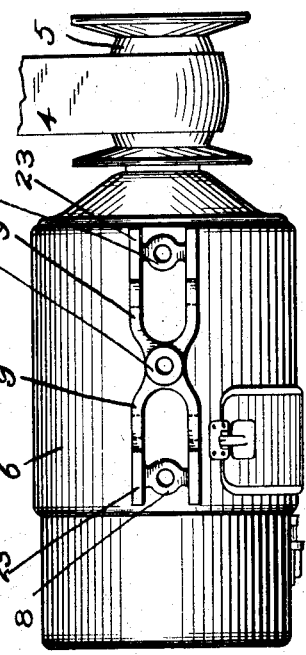
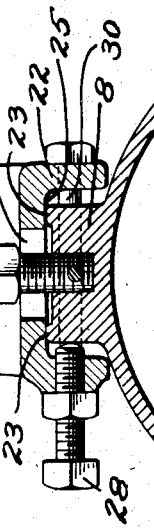
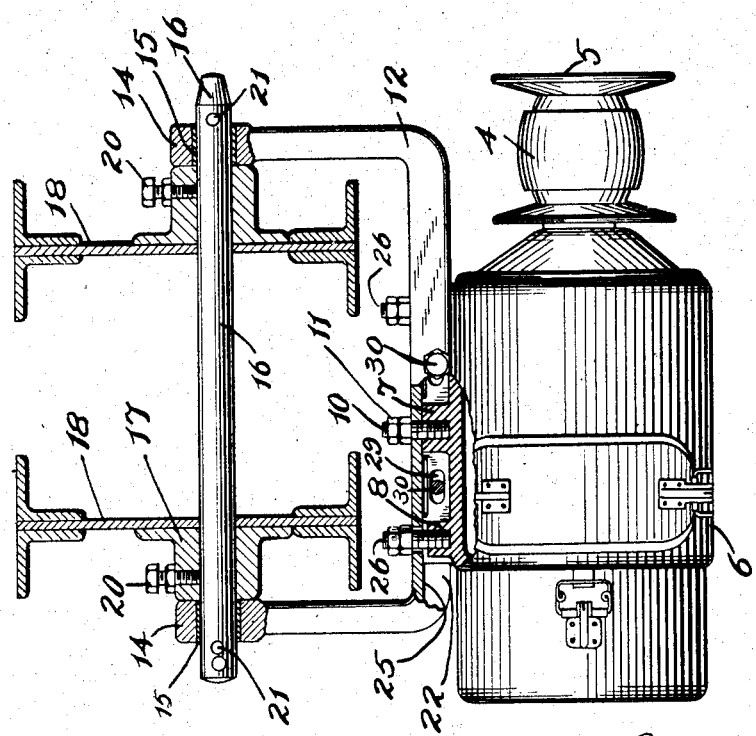
INVENTOR
Carl Hartmann
BY
John L. ——
ATTORNEY

UNITED STATES PATENT OFFICE.

CARL HARTMANN, OF ROCHESTER, NEW YORK, ASSIGNOR TO GOULD COUPLER COMPANY, A CORPORATION OF NEW YORK.

DYNAMO-MOUNTING.

1,344,945. Specification of Letters Patent. Patented June 29, 1920.

Application filed December 26, 1916. Serial No. 138,942.

*To all whom it may concern:*

Be it known that I, CARL HARTMANN, a subject of the Emperor of Germany, and residing at Rochester, county of Monroe, State of New York, have invented new and useful Improvements in Dynamo - Mountings, of which the following is a description.

My invention pertains to that class of means used to mount a dynamo or generator upon a structure and hold the dynamo in proper operative relation to a driving member having its position with relation to the said structure considerably altered during the operation of the generator. As my mounting is particularly applicable to a generator suspended from the body of a car and driven by a belt or equivalent means passing over a pulley or other driving means upon the car axle, it will be described with reference to such an application.

In the drawing, Figure 1 is an end elevation of a generator suspended by my improved means from a portion of a girder, such as is now used as an under frame supporting member in the construction of modern steel cars.

Fig. 3 is a side elevation and partial section of a generator and my improved mounting.

Fig. 4 is a top plan and partial section of a portion of my mounting.

Fig. 5 is a top plan of a generator particularly adapted to be used with my mounting.

Fig. 6 is a partial section of a generator frame and my mounting means showing details thereof.

Figure 2:
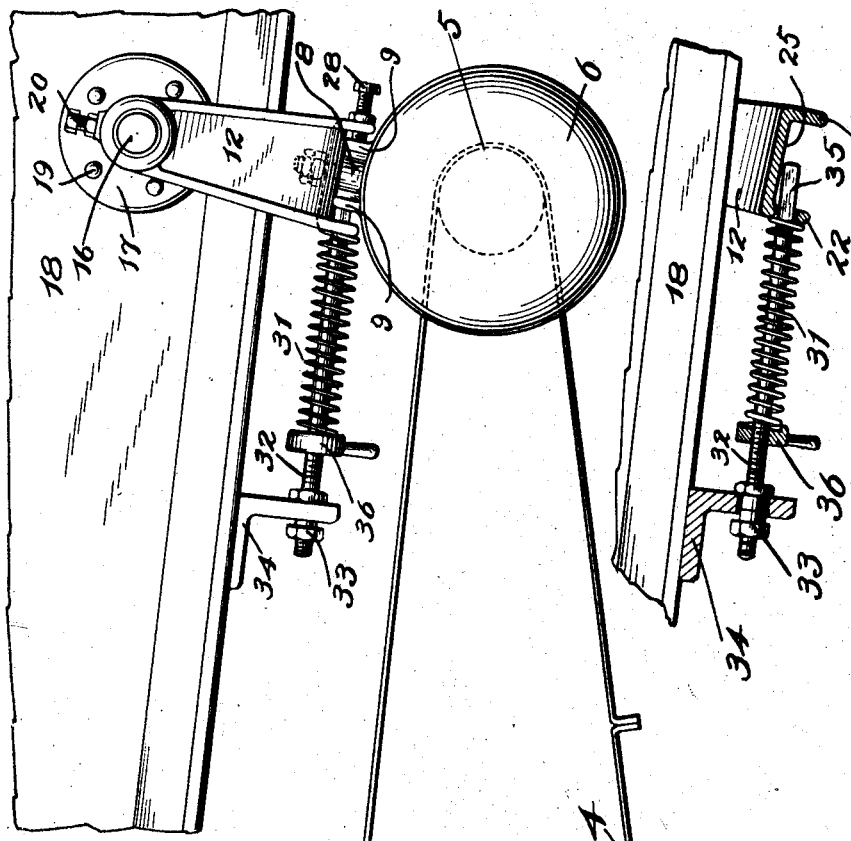
Fig. 2 is a partial elevation and section of a portion of the apparatus shown in Fig. 1, from which parts have been removed to more plainly show certain details of construction.
Figure 1:
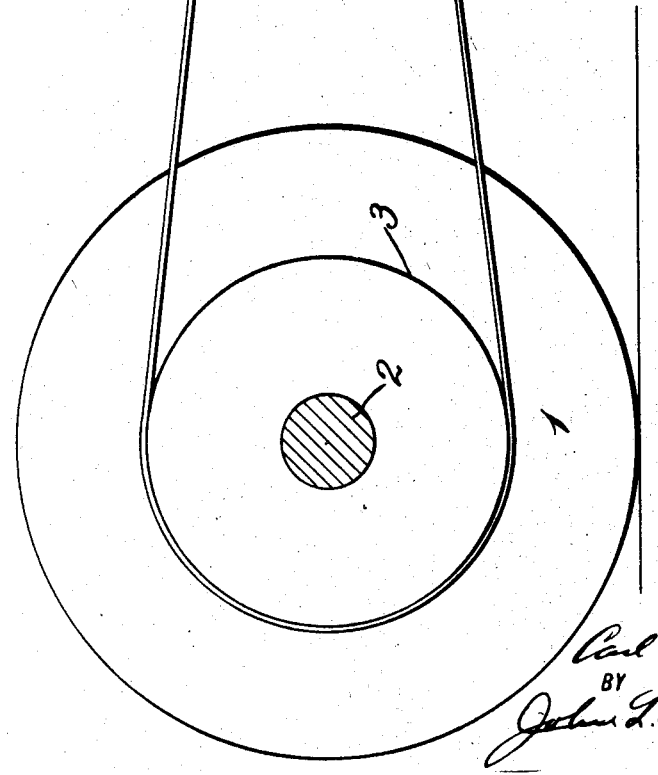

In Fig. 1, 1 represents a car wheel provided with the usual axle 2 carrying any suitable pulley or other driving means indicated at 3. 4 represents a belt or other suitable power transmitting means operatively engaging the pulley 3 and the pulley 5, shown in dotted lines in Fig. 1 and more fully shown in Figs. 3 and 5. The generator 6 is provided with a central lug 7 (see Figs. 3 and 5) and two outwardly disposed lugs 8 (Figs. 1, 3 and 5) united by the webs 9, as will hereinafter be more fully pointed out. The central lug 7 is provided with a stud 10 and nuts 11 and may serve to hold the generator in place against the lower face of the channel sectioned yoke 12 when the stud 10 is passed through the aperture 13 and the nuts 11 made up. The yoke 12 is provided with hubs 14 which have bushings as shown at 15, fitting the pin 16 which is snugly fitted into the flanges 17 held in place upon the girder webs 18 as by rivets 19. The pin 16 is held in proper position within the flanges 17 as by means of set screws 20 and, if desired, cotter pins or other means may be inserted in the apertures 21 of the pin 16 to insure holding of the same in place. The stud 10 and its respective boss 7 form what might be termed a king bolt, permitting a slight rotation of the generator with respect to the yoke in order that the same may be properly alined with reference to the car axle 2. The webs 9 are somewhat narrower from face to face than the distance between the flanges 22 of the channeled yoke 12, so as to permit sufficient motion for the purpose specified, and the outward extremities of the said webs 9 are united by the bosses 8 which are slightly depressed below the extremities or faced portions 23 of the webs 9, so that the said portions 23 may be drawn against the lower face 25 of the channeled yoke 12 when the studs 26 have the nuts thereupon made up. Thus the bearing points of the generator frame against the lower side of the yoke 12, or the surface 25, describe a larger area than the bosses 7 and 8 in alinement with each other would and make for an increase of rigidity in connection.

The channeled yoke 12 is provided with circular slots 27, through which the studs 26 are passed, so shaped as to allow the necessary rotation of the generator about the stud 10 to obtain proper alinement, and the generator may be swung about the stud 10, even when the nuts are all lightly made up and holding the generator fairly snugly, by means of the adjusting screws 28 on opposite sides of the center stud 10.

As an additional safety device for preventing the generator from dropping, in case the studs 10 and 26 should break, I perforate the webs 9, as shown in Fig. 3 at 29, and pass through the said perforations loosely fitting safety bolts 30, which fit snugly in suitable openings in the flanges of the channeled portion of the yoke 12.

Suitable tension is held upon the belt 4, by means of compression spring 31 surrounding the rod 32, having one extremity held in substantially fixed adjustable position by the nuts 33 on opposite sides of the angle iron 34. The opposite end of the rod 32 passes through one of the flanges 22 of the bracket 12 and is preferably of square or oblong section as indicated at 35 and loosely fits a square or oblong hole which prevents the rod from rotating. The spring 31 is held between any suitable nut, as indicated at 36, and one of the flanges 22 of the member 12, and therefore the tension upon the belt 4 may be adjusted by varying the position of the nut 36 upon its thread; and I preferably use a long spring 31, so that I may obtain a substantially constant tension for a given adjustment throughout the range of movement necessary in the ordinary operation of my device.

An operation of my invention is substantially as follows:

I perforate the webs 18 of the girders and fasten thereupon in proper alinement the flanges 17 as by rivets 19. I place the arms 12 in proper position and insert the pin 16 to hold the same in such position, and set up the set screws 20 and their jam nuts to properly retain the pin thus placed. I place the generator with the studs 10 and 26 passing through their respective openings 13 and 27 and with the members 23 of the webs 9 against the lower face 25 of the member 12, and fairly snugly make up the nuts 11 so as to hold the generator snugly against the lower face 25 of the said member 12. I loosely make up the nuts upon the studs 26 and properly aline the generator with reference to the axle 2 by manipulation of the set screws 28. I firmly set up the nuts upon the studs 26 and 10 and make up their respective jam nuts to hold the same firmly in place. I insert the safety bolts 30 and make up their nuts upon the same and preferably batter or peen the threaded ends so that the nuts cannot work off. After placing the rod 32 with its spring 31 in its proper position and securing it there by nuts 33, I apply the belt 4 and secure the proper tension upon the belt through the instrumentality of spring 31 by making up the nut 36. It will be obvious that as the axle 2 moves back and forth, the spring 31 will hold a fairly constant tension upon the belt 4 and that my generator will at all times remain substantially, though adjustably, connected with the car body unless some of its members part. The members under the most strain are naturally the studs 10 and 26 and should these part or the nuts thereupon work loose, the generator cannot drop as it will be suspended by the safety bolts 31 passing through the webs 9, which will serve to hold the generator from falling even though no longer held in its proper operative position.

From the foregoing, it will be obvious that my dynamo mounting adjustably connects the generator with a swinging yoke or support, which may be readily applied to the regular under-frame or supporting means now used in steel car construction, and that notwithstanding the adjustability of the said connection the points upon which the pressure determining the position of the generator depends describe a considerable area with its consequent rigidity of connection.

I do not wish in any way to limit myself to the exact details of construction, nor to the exact mode of operation described above, to give an embodiment of one form of my invention, for it will be obvious that considerable departure therein may be made without departing from the spirit and scope of my invention which is as set forth in the following claims:

1. A dynamo mounting comprehending a swinging member and means for adjustably holding a dynamo in fixed relation thereto.

2. A dynamo mounting comprehending a swinging member and means for adjustably holding a dynamo in fixed relation thereto and permitting angular adjustment with respect to the motion of the swinging member.

3. A dynamo mounting comprehending a swinging member and means for adjustably holding a dynamo in fixed relation thereto and permitting angular adjustment with respect to the swinging member.

4. A dynamo mounting comprehending a swinging member and means for adjustably holding a dynamo in fixed relation thereto and permitting adjustment of the dynamo in a direction at right angles to the movement of said swinging member.

5. A dynamo mounting comprehending a swinging member, means for adjustably holding a dynamo in operative relation thereto, means permitting motion necessary for adjustment of said dynamo and adapted to engage and hold the dynamo upon failure of the adjustable holding means.

6. A dynamo mounting comprehending a clevis combined with a support engaging and permitting a swinging movement of the same and means for adjustably attaching a dynamo in fixed operative relation to said clevis.

7. The combination with the car body and car axle of means carried by the car body and supported in such manner as to permit a swinging movement to and from the axle, of means for attaching a dynamo to said swinging member comprehending means whereby the relation of said dynamo to said member may be adjusted and held in adjustment.

8. The combination with the car body and car axle of means carried by the car body and supported in such manner as to permit a swinging movement to and from the axle, of means for attaching a dynamo to said swinging member comprehending means whereby the relation of said dynamo to said member may be adjusted and held in adjustment, a pulley upon the car axle, a pulley upon the dynamo, driving means engaging both of said pulleys and resilient means affecting the swinging member and maintaining substantially uniform tension upon said driving means.

9. A dynamo mounting comprehending a yoke provided with arms, means for operatively supporting and retaining the arms in a definite rotatable relation, means for rotatably attaching a dynamo to said yoke, and means for holding the same in fixed relation thereto.

10. A dynamo mounting comprehending a yoke provided with arms, means for operatively supporting and retaining the arms in a definite rotatable relation, means for adjustably attaching a dynamo to said yoke, and means for holding the same in fixed relation thereto.

11. A dynamo mounting comprehending a yoke having fixed arms, means for operatively carrying the extremities of said arms and permitting rotation thereof, means for adjustably attaching a dynamo to said yoke between said arms, and means for holding the same in fixed relation thereto.

12. A dynamo mounting comprehending a yoke having fixed arms, means for operatively carrying the extremities of said arms and permitting rotation thereof, means for adjustably attaching a dynamo to said yoke between said arms, and adjustable means for holding the same in fixed relation thereto.

13. A dynamo mounting comprehending a swinging member and means for carrying the same, means for adjustably attaching a dynamo to said member and means for holding the same in fixed adjustable relation thereto.

14. A dynamo mounting comprehending a swinging member and means for carrying the same, means for adjustably attaching a dynamo to said member and means for holding the same in fixed adjustable relation thereto comprehending a plurality of adjustable holding members.

15. A dynamo mounting comprehending a swinging member and means for carrying the same, means for adjustably attaching a dynamo to said member and means for holding the same in fixed adjustable relation thereto comprehending a plurality of adjustable holding members capable of allowing and restraining rotation.

16. Means for carrying a dynamo comprehending a swinging frame, a plurality of bosses upon said dynamo, and means for adjustably drawing said bosses against said frame, and means for retaining fixed adjustable relationship between said dynamo and said frame.

17. The combination with a car wheel and axle, a driving means upon said axle, a dynamo, and means for operatively connecting said driving means and said dynamo, of means for holding the dynamo in operative relation to said axle comprehending a swinging frame, means for adjustably holding the dynamo in rigid contact with said frame, and yielding means for urging said dynamo away from said axle.

18. The combination with a car wheel and its axle, a driving pulley upon said axle, a dynamo having a driving pulley, and a belt engaging both said pulleys, of means for carrying the dynamo comprehending a swinging member carried by the car, means for adjustably holding the dynamo in fixed relation to said swinging member and adjustable resilient means tending to swing said dynamo away from said axle.

19. The combination with a car body comprehending a plurality of longitudinal members, of means for supporting a dynamo comprehending a plurality of bearing members separately carried by a plurality of said longitudinal members, a transverse member carried by said bearing members, and means engaging said transverse member and adapted to suspend a dynamo in rotatable relation to said member.

20. The combination with a car body comprehending a plurality of longitudinal members, of means for supporting a dynamo comprising a transverse member supported near each end by different longitudinal members, means carried by said transverse member in rotatable relation thereto, and a dynamo carried by said means and rotatable about said transverse member.

21. The combination with a car body comprehending a plurality of longitudinal members, of a transverse rod having one end supported by one of said longitudinal members and its opposite end supported by another of said longitudinal members, means carried by said rod in rotatable relation thereto, and a dynamo carried by said means.

22. The combination with a car body comprehending a plurality of longitudinal members, of a transverse rod having one end supported by one of said longitudinal members and its opposite end supported by another of said longitudinal members, means carried by said rod in rotatable relation thereto, a dynamo carried by said means, and means for adjusting the relationship between the dynamo and its carrying means.

23. The combination with a car body comprehending a plurality of longitudinal underframing members and a truck comprising a rotary axle, of means for suspending a dynamo from the car body in operative relation to said axle comprising a transverse member, means for supporting one end of said member carried by one of the longitudinal members, means for supporting the other end of said transverse member carried by another of the longitudinal members, means suspended from said transverse member, a dynamo carried by said means, and means operatively connecting the dynamo with said axle.

24. The combination with a car body comprehending a plurality of longitudinal underframing members and a truck comprising a rotary axle, of means for suspending a dynamo from the car body in operative relation to said axle comprising a transverse member, means for supporting one end of said member carried by one of the longitudinal members, means for supporting the other end of said transverse member carried by another of the longitudinal members, means suspended from said transverse member, a dynamo carried by said means, and means operatively connecting the dynamo with said axle comprising a pulley on said axle, a dynamo driving pulley, driving means connecting said pulleys and means for urging rotation of the dynamo about said transverse member to control the tension upon the driving means.

CARL HARTMANN.